United States Patent
Bourk et al.

(10) Patent No.: US 6,259,916 B1
(45) Date of Patent: Jul. 10, 2001

(54) METHOD AND APPARATUS FOR MINIMIZING PERCEPTIBLE IMPACT ON AN INTERRUPTED CALL PRIOR TO HAND-OFF

(75) Inventors: Terrance Raymond Bourk, San Diego; Neal K. Riedel, Encinitas, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 08/692,552

(22) Filed: Aug. 6, 1996

(51) Int. Cl.$^7$ .................................................. H04Q 7/22
(52) U.S. Cl. .................. 455/434; 455/437; 455/515; 455/525; 455/62; 455/67.1
(58) Field of Search .............................. 455/434.39, 436, 455/437, 438, 439, 515, 517, 525, 62, 67.1

(56) References Cited

U.S. PATENT DOCUMENTS 5,289,525 * 2/1994 Issenmann et al. .................. 455/436
5,404,573 * 4/1995 Yabe et al. ....................... 455/515 X

* cited by examiner

*Primary Examiner*—William G. Trost
*Assistant Examiner*—Philip J. Sobutka

(57) ABSTRACT

Method and apparatus for reducing the perceptible impact to user traffic during a hand-off process in a full duplex wireless communications system having subscriber units and base stations, the subscriber unit being responsible for locating candidate base stations where the subscriber unit monitors the voice activity of the subscriber unit user and/or network user (connected to the base station) and uses the monitored activity to determine when it may miss one or more signal transmissions or receptions to search for a candidate base station without perceptibly impacting the voice traffic between the subscriber unit user and network user.

18 Claims, 2 Drawing Sheets

METHOD AND APPARATUS FOR MINIMIZING PERCEPTIBLE IMPACT ON AN INTERRUPTED CALL PRIOR TO HAND-OFF

CROSS-REFERENCE TO RELATED APPLICATIONS

This application is related to co-pending application Ser. No. 08/013,625, filed Feb. 2, 1993, which is assigned to the same assignee and is incorporated herein by reference.

FIELD OF THE INVENTION

The present invention relates generally to full duplex wireless communication systems having subscriber units and base stations and more particularly to systems where the subscriber units initiate hand-offs between base stations.

BACKGROUND OF THE INVENTION

FIG. 1 is a block diagram of a subset of a full duplex wireless communication system 30, the subset having a subscriber unit ("SU") 10 and base stations ("BS") 22, 24, 26, and 28. Note: only a single SU 10 is shown for illustration of the invention, a complete wireless communication system normally would have many subscriber units 10 compared to the number of base stations 22, 24, 26, and 28 in the system. In the wireless communication system 30, the subscriber unit 10 transceives signals between the base stations 22, 24, 26, and 28. During a call, the subscriber unit 10 is linked to a single base station 22, 24, 26, and 28. Ideally, the subscriber unit 10 is linked to the base station 22, 24, 26, or 28 which provides the best transmission signal. For illustration purposes, subscriber unit 10 is linked to base station 22 in FIG. 1. As a consequence, subscriber unit 10 transceives signals with the base station 22.

The configuration shown in FIG. 1, however, is not static. The subscriber unit 10 may move in relation to base station 22 (and in some systems, the base stations may move) or interference or blockage may arise. Due to the changes in the radio propagation environment between the subscriber unit 10 and base station 22 this link may no longer provide the best transmission signal, in fact, the signal to noise ratio may not be high enough for clear transmission of signals from the subscriber unit 10 to the base station 22 and visa versa. In such a case, the subscriber unit 10 may change its link from base station 22 to another base station 24, 26, or 28 (depending which base station provides an adequate transmission signal and also has capacity to support a new call). The process of changing the base station to which the subscriber unit 10 is linked is termed a hand-off.

In many wireless communication systems, more particularly, modern personal communication systems ("PCS"), the subscriber unit has the task of deciding which base station has the strongest transmission signal. In some systems, the subscriber unit must also request a hand-off to that base station. Thus, in addition to transceiving signals from the base station to which the subscriber unit is currently linked, the subscriber unit must also sample signals from other base stations to determine which one can support adequate communication. Further, the subscriber unit 10 may also need to process control information to determine whether base stations which have adequate signal strength also have the capacity to transceive signals from the subscriber unit 10. Due to limitations imposed by the need to keep subscriber units small and low cost, it often is not possible for the subscriber unit to simultaneously maintain a call and perform tasks to initiate a hand-off. As a consequence, subscriber units may be precluded from starting a hand-off process until the link between the current base station has degraded below some criterion level. At this point, the communications is noticeably degraded or dangerously close to that point.

Ideally, the hand-off process should be "hit-less", i.e., the transceiving process in the subscriber unit 10 should not be interrupted during a hand-off nor should the communication link between the current base station degrade to an unacceptable level. The subscriber unit, however, has limited processing capabilities and, thus, is not always able to evaluate received signals from nearby base stations or carry out two-way communications with other base stations while transceiving signals from its current base station. Thus, the transceiving process is usually interrupted during a hand-off for a noticeable time period (on the order of a second or more) in some PCS after the signal from the current base station has degraded to an unacceptable or even unusable level. This impact to the user of the subscriber unit 10 should be reduced or eliminated.

The subscriber unit, thus, needs a mechanism/process which enables the unit to monitor the signal quality of nearby base stations while transceiving signals from a current base station. Ideally, this mechanism/process should be active/performed continuously so when the signal quality from the current base station degrades below a threshold greater than the level where communication is interrupted, the subscriber unit will have a list of base stations with acceptable signal levels. The mechanism/process should not require changes to the existing architecture of the unit which would increase battery consumption or production costs of the subscriber unit 10.

SUMMARY OF THE INVENTION

The previously described problems are overcome and the objects of the invention are achieved in apparatus and methods for employing knowledge of when communication in one direction or other is not critical to reduce hand-off hits. In voice communication systems such a measure of the criticality is voice activity detection. The method generally interrupts communication between two devices based on whether communication between one of the two devices is critical.

The devices may be radio devices using wireless communication. The determination of whether the communication is critical is a function of the activity of a signal between the devices. If the signal is a voice signal, lack of voice activity may be detected in order to determine whether the signal is critical. Further, the quality of a signal from one of the devices to the other may also be monitored to determine whether the communication of a signal is critical.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION

Figure 1:
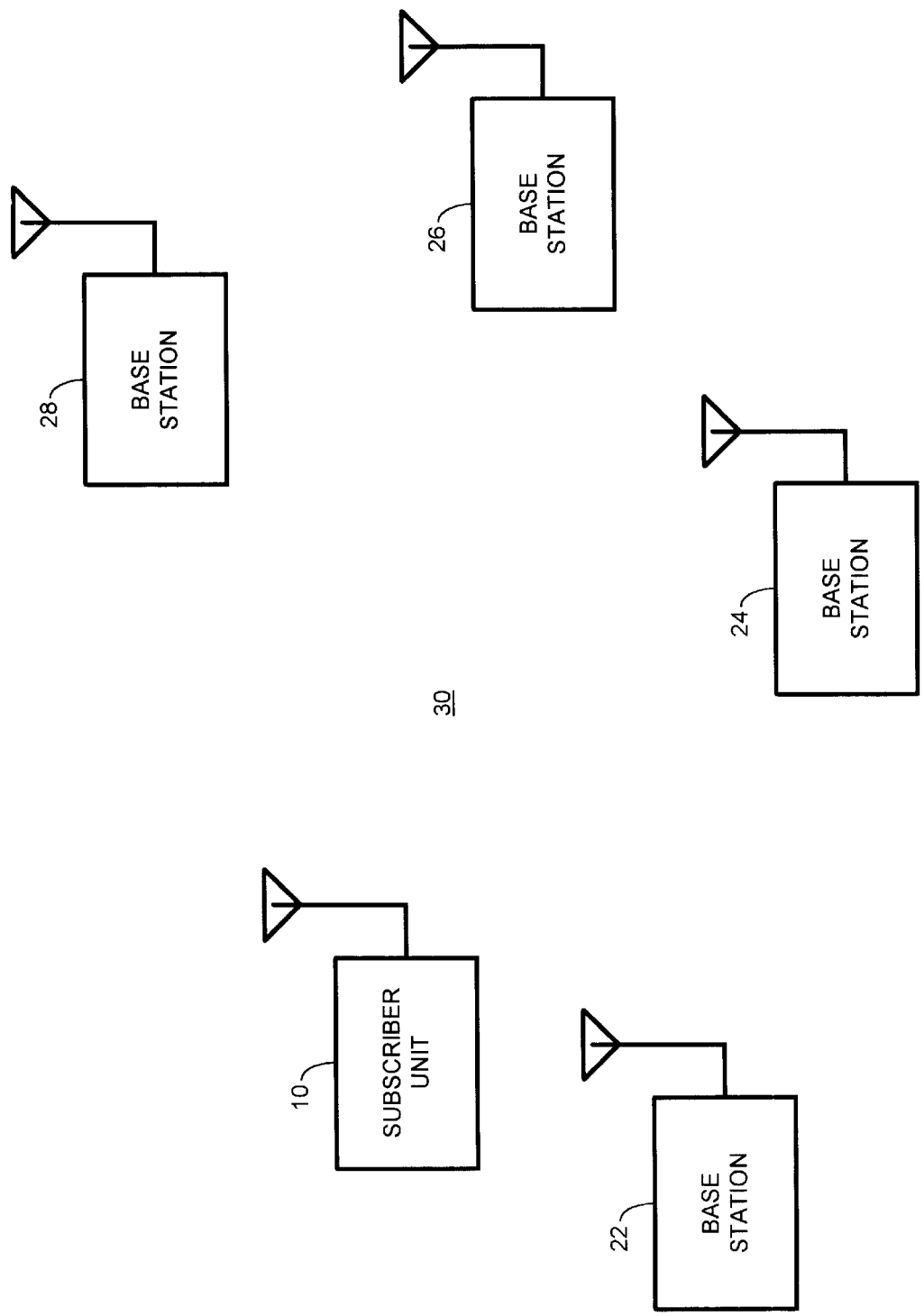
FIG. 1 is a block diagram of a subset of a full duplex wireless communications system having a subscriber unit and base stations.
Figure 2:
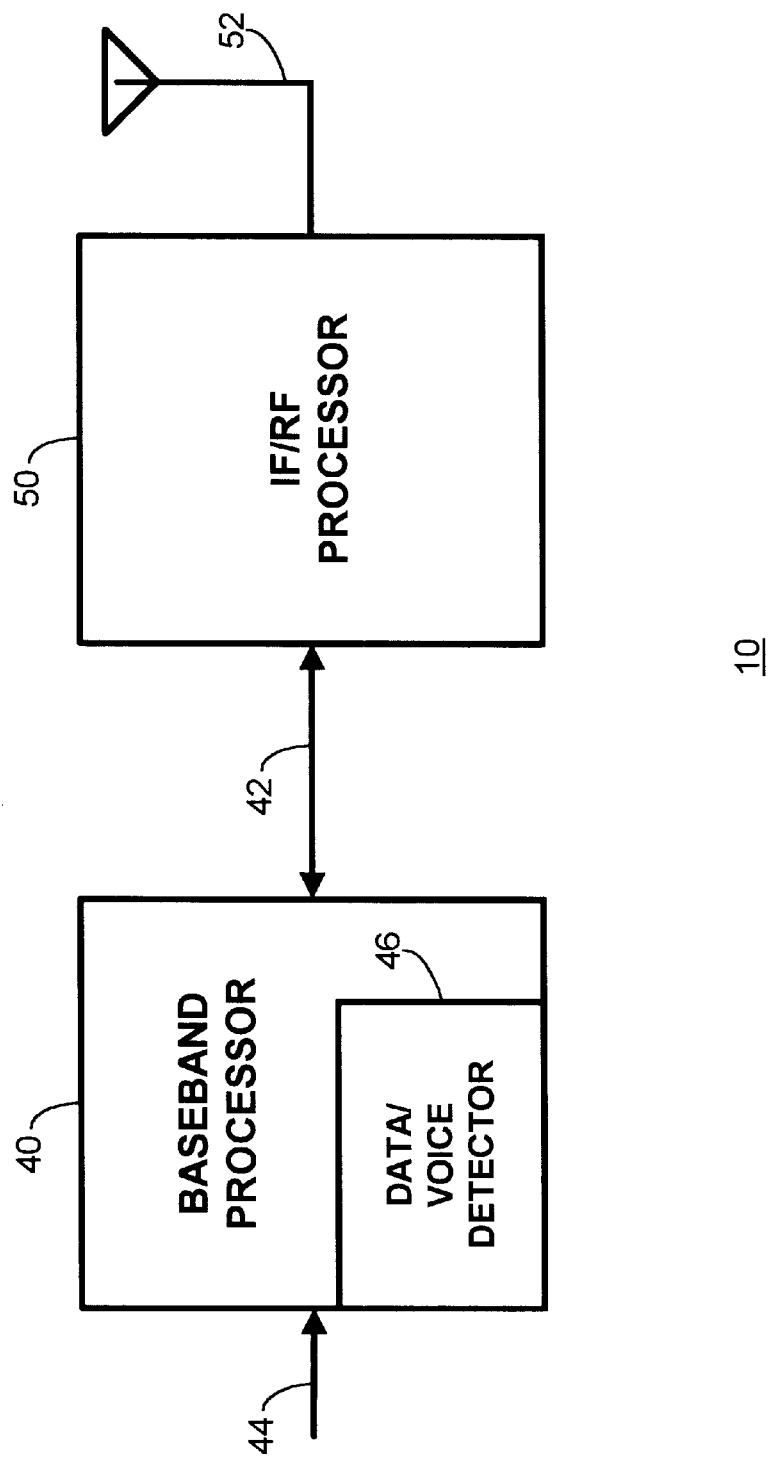
FIG. 2 is block diagram of a generic subscriber unit according to the present invention.

FIG. 2 is a block diagram of a generic subscriber unit 10 according to the present invention. A more detailed description of an exemplary subscriber unit can be found in co-pending application Ser. No. 08/013,625, filed Feb. 2, 1993, which is assigned to the same assignee and has been incorporated by reference above. The generic subscriber unit 10 includes a baseband processor 40, combination Intermediate Frequency/Radio Frequency (IF/RF) processor 50, and antenna 52.

The baseband processor 40 receives a voice or data signal from input port 44. The baseband processor may also output a voice or data signal to port 44 or another port (not shown). The baseband processor 40 processes the voice or data signal and transmits the processed signal via 42 to the IF/RF processor 50. The IF/RF processor 50 modulates the signal and carrier shifts the modulated signal to a radio frequency required for transmission via the antenna 52 to a base station to which the subscriber unit may be linked. Signals from a base station are received by the antenna 52 and carrier shifted to baseband and demodulated by the IF/RF processor 50. The baseband, demodulated signal is further processed by the baseband processor 40.

As noted in the background of the invention, the wireless communications system is a full duplex system. In such a system, a signal is received from a base station close in time to when a signal is transmitted to the base station from the subscriber unit 10. For example: during a telephone conversation the subscriber unit 10 and a base station may be used to transceive a voice communication between a user of the subscriber unit 10 and another user connected to the base station. During the conversation (this could also apply to three or more way conversations), both parties may be talking, i.e., full duplex communication. Note: even if only one user is talking, the talking user hears background noise from the other user.

The present invention exploits the conduct of two way conversations: that normally only one person is talking at a time. Certain data transfers (such as by modem) may also have this attribute depending on the handshaking arrangement between the communicating devices. As noted above, it is desired to reduce hits during a hand-off process, in particular, where the subscriber unit initiates the hand-off process. Due to cost and limited size, subscriber units 10 have a limited ability to search for other base stations which have adequate signal quality while also processing a full duplex signal. In some systems, the subscriber units may also be required to determine whether any candidate base stations have available capacity.

The timing requirements of full duplex communication limit the ability of a low cost subscriber unit to search for candidate base stations. In detail, during full duplex communications, a subscriber unit is required to transceive signals during precise intervals. In a system having digital encoding of speech signals, it may be possible to bunch up the transmission of the encoded signal into bursts for higher speed transmission. This burst structure may permit such transmissions to occupy less bandwidth of the radio channel, thereby permitting or enabling the subscriber unit to have periods of transmission, periods of reception and possibly periods with no required activity on the radio channel.

In order to transceive signals, the subscriber switches between transmit and receive modes. This reduces the time the subscriber may receive downlink signals from candidate base stations to determine signal quality indicators ("SQI") such as Receive Signal Strength Indicator "RSSI", bit error rate or burst error rate for the candidate base stations. In order for a subscriber unit to sample reception conditions (determine SQI) from base stations being considered candidates for a hand-off, the subscriber unit will typically need to switch to other frequencies. The synthesizer in the subscriber unit requires time to make a frequency change. The 'switching time' for the synthesizer can be a significant fraction of the time available between the ongoing receive and transmit operations associated with the existing communications link. Depending on synchronization (or lack thereof) between base stations and the assignment of the subscriber unit 10 to particular transmit and receive times, a candidate station may broadcast its downlink signal at a time too close to a receive or transmit operation time for the subscriber unit to be able to receive the signal (in order to process the signal to determine SQI for the base station).

The reception of downlink signals from candidate base stations may be further complicated if the downlink signals are low duty cycle bursts for which the subscriber unit does not have a priori timing information. First, the subscriber unit may need to scan for downlink signals broadcast on frequencies different from the carrier frequency used to transceive signals between its current base station. In addition, if the base station transmissions are not synchronized, the subscriber unit may need to scan for long time intervals to receive downlink signals since the subscriber unit does not know precisely when to listen for the transmission of the downlink signals. In order to help reduce this problem, the current base station may provide timing offset and carrier frequency information for downlink signals of nearby base stations. This information would reduce the time interval a subscriber units needs to scan a particular (and known) frequency to receive a downlink signal from a candidate base station.

Even with downlink signal offset and frequency information, a subscriber unit may not be able to receive a downlink signal from a candidate base station and process the signal to determine SQI without interrupting full duplex communication with its current base station when the downlink signal is broadcast too close in time to either when the subscriber unit is expected to transmit a signal to or to receive a signal from its current base station. Thus, the subscriber unit may take a hit (interrupt communications) in order to receive and process such a downlink signal. Since hits to communication are to be avoided as much as possible, receptions and evaluations of downlink signals from other base stations are not generally performed until the signal from the presently linked base station has already degraded to an unacceptable level.

The present invention allows a subscriber unit to determine SQI from downlink signals received from such a base station signal while not perceptibly impacting communication (not causing a hit) but interrupting full duplex communications. To enable a subscriber unit to receive and process downlink signals of nearby base stations regardless of their broadcast cycle in relation to the transceive cycle of the subscriber unit, the subscriber unit of the present invention employs a data/voice activity detector ("VOX") 46. The VOX 46 detects data or voice activity on either a received signal (from the other user) or transmitted signal (from the user of the subscriber unit). By monitoring the voice or data activity of received and transmitted signals, the subscriber unit can determine times when it may sample a downlink signal from a base station to determine SQI while not perceptibly impacting voice or data communications.

In detail: in order to receive and process a downlink signal from a base station whose broadcast cycle is close to or overlaps the transmit cycle of the subscriber unit, the unit waits until the VOX detects that the user is not talking and/or the other user is talking. Then, the unit receives and processes the downlink signal from the base station for one or more cycles to determine SQI rather than transmitting signals to the base station. This should not perceptibly impact user communications (produce a "hit") since the subscriber unit user was not talking and/or the other user was talking. Likewise, in order to receive and process a downlink signal from a base station whose broadcast cycle is close to or overlaps the receive cycle of the subscriber unit, the unit waits until the VOX detects that the other user is not talking and/or the subscriber unit user is talking. Then, the unit receives and processes the downlink signal from the base station for one or more cycles to determine SQI rather than receiving signals from the base station. This also should not produce a "hit" since the other user was not talking and/or the subscriber unit user was talking. As noted above, this technique also applies to data transmissions where the protocol does not require a receipt for each transmission.

In one embodiment of the invention, only the voice of the user of the subscriber unit is evaluated by the VOX 46. When the signal between the subscriber unit and its current base station start to degrade it may become difficult to evaluate the signal received from the base station. Thus, it would be difficult for the VOX 46 to determine whether the other user (communicating via the base station) was talking or not talking. In this embodiment, in order to receive and process a downlink signal from a base station whose broadcast cycle is close to the transmit cycle of the subscriber unit, the unit waits until the VOX detects that the user is not talking. Likewise, in order to receive and process a downlink signal from a base station whose broadcast cycle is close to the receive cycle of the subscriber unit, the unit waits until the VOX detects that the other user is not talking as inferred by the detection that the user is talking.

Because there is little or no hit using this method or apparatus, the subscriber unit 10 may search for candidate base stations even when the currently linked base station signal is acceptable. This would allow a quick hand-off to an appropriate base station as soon as the signal from the currently linked base station starts to degrade. Thus, the hand-off threshold could be increased. In order to bypass the transmission or reception of signals between the base station during non-duplex voice traffic, the subscriber unit must decide when non-duplex voice traffic is occurring based on the VOX 46 information. In particular, the subscriber unit monitors the output of the VOX 46 for a period sufficient to ensure skipping one or more burst times will not perceptibly impact voice traffic.

The time interval a user is talking or not talking before an interruption is imposed could be varied based on the quality of the signal from the current base station. In particular, a longer time interval, T1, may be used when the current base station is adequately carrying a call (the transmission quality is adequate). Monitoring for a long time interval may increase the probability that the determination of talk/not talk is correct, but may also reduce the time that determination is applicable. A shorter time interval, T2, may be used when the current base station is not adequately carrying a call (the transmission quality fells below a minimum threshold and candidate base station monitoring is critically needed). When the link is good, the monitoring of other base stations is not critical. It is still valuable to monitor other base stations (when time interval>T1) because the signal from the present base station may degrade rapidly depending on the physical location of the base station and position of the subscriber unit. Likewise, when the link has degraded and monitoring is more urgent, the criteria (time interval) should be relaxed (reduced). When the link performance becomes severely degraded, the subscriber unit may shorten the interval further to a time interval T3>T2 or ignore the output of the VOX 46 altogether.

In one embodiment of the invention, the VOX 46 may provide a value, p(S), which is the probability that speech is occurring for either the user of the subscriber unit or other user communicating with the base station. In such an embodiment, the p(S) could be used separately or in combination with the time interval mentioned above (in this case, the time interval p(S) has been above or below a certain value.) For example, in the embodiment where VOX 46 only considers the activity of the user of the subscriber unit, there may be several values of p(S) used as thresholds for detecting the presence or absence of voice activity as a function of the quality of the downlink signal from the current base station. If the signal quality is high, voice activity may not be presumed to present unless p(S) is close to 1.0, likewise, voice activity may be presumed not to be present unless p(S) is close 0.0 (i.e., strict tolerances). When the signal quality degrades below a certain threshold, Th, the tolerances may be relaxed, i.e., p(S) may be less than 0.8 and speech still presumed or p(S) may be greater than 0.2 and the lack of speech still presumed. Finally, if the signal quality degrades to a level where communication is degraded, speech may be presumed when p(S) is greater than one value (such as 0.6) and presumed not to be present otherwise, i.e., a single binary threshold is employed where speech is considered to be present or not present.

As noted initially, the present invention is directed at reducing the hit (impact to voice traffic) caused by a hand-off process. Thus far, a technique has been presented for reducing or canceling any perceptible impact on voice traffic when the subscriber unit monitors and processes other base stations' downlink signals to determine SQI. In some systems, the subscriber may also determine the availability of candidate base stations (to add a subscriber unit). In addition in some systems, the subscriber unit may select a new base station based on its availability and determined SQI and inform its current base station of its selection so the current base station can request a hand-off for the subscriber unit. In order to complete a hand-off process, the subscriber unit must link to an available base station it has determined as having the best (or appropriate) SQI. The subscriber unit performs the change in linkage by performing a handshake operation with the chosen base station. The handshake operation requires both transmission to and reception from the chosen base station. If the handshake operation is performed after a period of voice activity by the user of the subscriber unit has ended, the impact on voice traffic will be reduced.

Further, using voice/data activity monitoring, it may be possible to perform the identification of the new base station and handshaking with the new base station while not perceptibly impacting the communications link with the current base station. Thus, this technique reduces the impact on the communications link during a handoff. In addition, this technique permits the transfer or hand-off threshold, Th, to be lowered so that the hand-off will be performed before the link degrades to a level that is noticeable by the subscriber unit user.

As noted above, subscriber unit 10 is a generic unit. An exemplary subscriber unit in which the invention may be embodied is described below. The configuration of the network and subscriber are not presented in detail here but may be found in co-pending application Ser. No. 08/013, 625, filed Feb. 2, 1993, which is assigned to the same assignee and has been incorporated herein by reference. In the personal handy-phone system ("PHS") described in the incorporated co-pending application, the traffic channel is carried on a slotted pair of a given traffic frequency. The frame structure for communication between base stations and subscriber units has eight time slots, four receive slots followed by four transmit slots where the first receive slot corresponds to the first transmit slot and the other time slots follow the same pattern. The length of a frame is 5 ms. The base station downlink signal which is processed to determine SQI is provided on a control channel. The control channel downlink (from the base stations to subscriber units) is a low duty-cycle burst transmission on a dedicated control frequency shared by all the base stations in a given carrier's network (1 slot every 20th frame; i.e., $\frac{1}{160}$ duty-cycle). The channel structure is TDMA/TDD. Thus both directions of communication are carried on a single RF frequency allocation. Since there are 8 time slots per frame, the channel can support 4 full-duplex calls.

The application of the present invention to the PHS is particularly useful because the PHS system design precludes a low cost subscriber device from monitoring all the time slots that could be used by other base stations. In addition, PHS was designed to have an unsophisticated hand-off late in the standardization process. As a consequence, minimal consideration was given to the problem of selecting a new base station while maintaining a voice or data connection with a current base station. The hand-off process in PHS presently requires a subscriber unit to stop communications for a time period on the order of at least $\frac{1}{4}$ to $\frac{1}{2}$ seconds to search for a new base station. The handshake process with a new base station causes additional outage. Overall, there is an outage of one or more seconds during hand-off.

It is noted that in the PHS, the frame times between base stations may not be synchronized. This may cause further outage during a hand-off. Thus, it is desirable to synchronize all base stations via a common clock provided to a server attached to one or more base stations (then the servers, themselves could be synchronized to form a network where all the base stations are synchronized.) It is assumed that such a synchronization scheme is provided for the base stations discussed here, i.e., the base stations have synchronized frame times such that 4 uplink (subscriber unit transmit) and 4 downlink (subscriber unit receive) slots are roughly aligned (within about $\frac{1}{8}$ of a slot time).

During the initiation of a call, a subscriber unit may be assigned to any of the four possible slot times on a given traffic frequency. In order for a subscriber unit to determine SQI of other base stations, the subscriber unit receives (monitors) and processes control channel bursts from the other base stations. Since these bursts can be in any downlink slot, a subscriber unit must be capable of performing a receive operation during any of the four downlink slots. In addition, if the synchronization between base stations is not ideal, some tolerance on burst timing must be added. During monitoring activities, a subscriber unit typically requires almost up to one slot in time (0.625 ms) in order to change receive frequencies to be able to receive and process a control channel burst from a base station to determine SQI.

As noted above in relation to generic subscriber units, in order to minimize the perceptible impact of monitoring and processing control signals of other base stations, the subscriber should only perform monitoring and processing when the monitoring and processing will have a minimal impact on the voice quality for uplink and for downlink. In PHS, when a subscriber unit user is not talking, the subscriber is permitted to inform the base station that it has entered a "VOX period". During such a period, the base station only expects to receive a transmission from the subscriber unit every fourth PHS frame time. Thus, during VOX periods, up to three out of every four uplink frames are not transmitted.

Thus, if the base station the subscriber unit wants to monitor and process a control burst during one of the VOX periods, the subscriber unit can do so without perceptibly impacting voice traffic. In addition, the subscriber unit can transmit frames of normal uplink voice packets every frame time and invoke the VOX mode only during the frame that corresponds to the control burst to be monitored and processed. Also, since a base station has to be able to handle a missed uplink burst from the subscriber unit, the subscriber unit can simply not send a burst when there is no user voice activity even if the frame is expected during VOX mode (one of the four frames the base station expects during VOX mode).

If the control burst does not occur during a VOX period, then a subscriber unit may monitor voice/data activity in order to receive and process control burst frames of candidate base stations. For illustration below, it is assumed that the subscriber unit requires approximately a time slot (of time) to switch between the traffic channel frequency for the current base station and a control channel frequency of a base station to be monitored and processed. As detailed above, there are four receive slots and four transmit slots in the PHS frequency scheme. When a control burst is to be monitored, it occurs in one of the four receive slots (assuming reasonable synchronization between base stations). The format of frame is then R1, R2, R3, R4, T1, T2, T3, T4.

If a subscriber unit in PHS has been assigned the first slot by its current base station, then the unit must listen for incoming signals at time slot R1 in the frame and transmit signals to the base station at time slot T1. As noted above, it is assumed that subscriber unit requires a time slot (of time) to change frequencies. Thus, for example, if a control burst of interest occurs in time slot R2, the subscriber unit will not be able to change frequencies in time to monitor (receive the signal) without impacting voice traffic. The subscriber unit needs to be tuned to the traffic frequency before the occurrence of time slot R1 and thus, cannot change to the control channel frequency by time slot R2. Likewise, if the control burst occurs at time slot R4, the subscriber unit will not be able to receive and process the control burst without impacting transmit slot T1. The subscriber needs time to tune to the traffic frequency so it may transmit a signal during its transmit slot, T1 (which adjacent to time slot R4). Of course, the subscriber unit can not receive a control burst that occurs in time slot R1 or T1 without impacting voice traffic. The subscriber unit, however, may receive a control burst that occurs in time slots R3 or T3. In such a case, the subscriber unit would have a time slot to switch from traffic frequency to control channel frequency (during time slot R2 or T2). Thus, the subscriber unit may receive and process the control burst to determine SQI and change the frequency back to the traffic frequency before it must transmit a signal at time slot T1 or receive a signal at time slot R1 to avoid any impact to voice traffic.

Similar scenarios unfold for subscriber units assigned time slots 2, 3, or 4. The various scenarios are detailed in Tables 1 and 2 below for the embodiment of the invention that considers the activity of the user of the subscriber unit. In order for the subscriber unit to receive control bursts during any time slot, the voice activity of the subscriber user (or network user attached to the base station) is monitored in accordance with the present invention. For example, if a subscriber unit is assigned time slot 1 and needs to receive and process a control burst during time slot R1, R2, or T4, the subscriber unit waits for a period when the subscriber user is talking (and/or the network user is listening).

| Traffic Channel | Always | During Talking | During Listening |
|---|---|---|---|
| 1 | R3, T3 | R1, R2, T4 | R4, T1, T2 |
| 2 | R4, T4 | R1, R2, R3 | T1, T2, T3 |
| 3 | R1, T1 | R2, R3, R4 | T2, T3, T4 |
| 4 | R2, T2 | R3, R4, T1 | R1, T3, T4 |

This is denoted in Table 1, as "during Talking", and by a "T" in Table 2, i.e., when the subscriber user is talking (and/or the network user is not talking). In such a case, the subscriber unit drops voice traffic sent from the base station (does not receive a signal from its current base station during time slot R1). In order to reduce the perceptible impact of dropping receive signals from the base station, the subscriber unit may produce background noise to replace the skipped receive signals. The subscriber unit may generate random noise to be used in place of a lost signal from the base station. In addition, the subscriber unit may estimate noise received from previous signals received from the base station.

| | | \multicolumn{8}{c}{Control Channel Slot to be Received} |
|---|---|---|---|---|---|---|---|---|---|
| | | R1 | R2 | R3 | R4 | T1 | T2 | T3 | T4 |
| Traffic | 1 | T | T | A | L | L | L | A | T |
| Slot | 2 | T | T | T | A | L | L | L | A |
| Assignment | 3 | A | T | T | T | A | L | L | L |
| | 4 | L | A | T | T | T | A | L | L |

If a subscriber unit wants to receive and process a control burst from receive time slot 4 (R4), then a transmit signal (T1) must be dropped. In this case, the subscriber unit waits for a period where the subscriber user is not talking (and/or the network user is talking). This is denoted as "during listening" in Table 1 and by a "L" in Table 2, indicating that the subscriber user is not talking (and/or the network user is talking). Tables 1 and 2 also indicate the required modes of voice activity for the other time slots and control burst slots. The "A" in these tables indicates that control burst can "always" be received and processed in this time slot regardless of voice activity (assuming it takes no more than a time slot to change frequencies). Note: if the control channel slot for a desired base station occurs during a slot that is always available because of the current time slot assignment for the subscriber unit (an "A" slot in Table 1), then a hand-shaking operation may be also be performed without impacting voice communications in the PHS subscriber unit. This creates a strong bias to select a candidate base station whose control channel slot meets this criterion.

While the invention has been described and illustrated with reference to specific embodiments, those skilled in the art will recognize that modifications and variations may be made without departing from the principles of the invention as described hereinabove and set forth in the following claims.

What is claimed is:

1. In a subscriber unit, a method of minimizing perceptible impact on an interrupted call during the monitoring of signal quality indications (SQI) of neighboring base stations prior to a hand-off operation, the method comprising the steps of:

establishing a call between the subscriber unit and a first base station on a first channel;

periodically identifying an SQI of the call on the first channel;

identifying the beginning of a lack of voice activity interval during the call;

determining a call interruption interval as a function of the SQI of the call, where the call interruption interval is dynamically variable as a function of SQI; and interrupting the call as a function of the call interruption interval and the beginning of the lack of voice activity interval to switch to a second channel so as to monitor the SQI of at least one neighboring base station.

2. The method of claim 1, wherein the call interruption interval is a fixed interval T1 when the SQI is good, and a fixed interval T2 when the SQI is poor.

3. The method of claim 2, wherein interval T1 is longer than interval T2.

4. In a subscriber unit including a Voice Activity Detector (VOX), a method of minimizing perceptible impact on an interrupted call during the monitoring of signal quality indications (SQI) of neighboring base stations prior to a hand-off operation, the method comprising the steps of:

establishing a call between the subscriber unit and a first base station on a first channel;

periodically identifying an SQI of the call on the first channel;

identifying a probability of a lack of voice activity value during the call;

determining a call interruption interval as a function of the SQI of the call, where the call interruption interval is dynamically variable as a function of SQI; and interrupting the call as a function of the call interruption interval and the probability of the lack of voice activity value to switch to a second channel so as to monitor the SQI of at least one neighboring base station.

5. The method of claim 4, wherein the call interruption interval is a fixed interval T1 when the SQI is good, and a fixed interval T2 when the SQI is poor.

6. The method of claim 5, wherein interval T1 is longer than interval T2.

7. A subscriber unit adapted for minimizing perceptible impact on an interrupted call during the monitoring of signal quality indications (SQI) of neighboring base stations prior to a hand-off operation, comprising:

means for establishing a call between the subscriber unit and a first base station on a first channel;

means for periodically identifying an SQI of the call on the first channel;

means for identifying the beginning of a lack of voice activity interval during the call;

means for determining a call interruption interval as a function of the SQI of the call, where the call interruption interval is dynamically variable as a function of SQI; and means for interrupting the call as a function of the call interruption interval and the beginning of the lack of voice activity interval to switch to a second channel so as to monitor the SQI of at least one neighboring base station.

8. The subscriber unit of claim 7, wherein the call interruption interval is a fixed interval T1 when the SQI is good, and a fixed interval T2 when the SQI is poor.

9. The subscriber unit of claim 8, wherein interval T1 is longer than interval T2.

10. A subscriber unit adapted for minimizing perceptible impact on an interrupted call during the monitoring of signal quality indications (SQI) of neighboring base stations prior to a hand-off operation, the method comprising the steps of:

means for establishing a call between the subscriber unit and a first base station on a first channel;

means for periodically identifying an SQI of the call on the first channel;

a VOX for identifying a probability of a lack of voice activity value during the call;

means for determining a call interruption interval as a function of the SQI of the call, where the call interruption interval is dynamically variable as a function of SQI; and means for interrupting the call as a function of the call interruption interval and the probability of the lack of voice activity value to switch to a second channel so as to monitor the SQI of at least one neighboring base station.

11. The subscriber unit of claim 10, wherein the call interruption interval is a fixed interval T1 when the SQI is good, and a fixed interval T2 when the SQI is poor.

12. The subscriber unit of claim 11, wherein interval T1 is longer than interval T2.

13. A computer program, residing on a computer-readable medium, for minimizing perceptible impact on an interrupted call during the monitoring of signal quality indications (SQI) of neighboring base stations prior to a hand-off operation, the computer program including instructions for causing a subscriber unit to:

establish a call between the subscriber unit and a first base station on a first channel;

periodically identify an SQI of the call on the first channel;

identify the beginning of a lack of voice activity interval during the call;

determine a call interruption interval as a function of the SQI of the call, where the call interruption interval is dynamically variable as a function of SQI; and interrupt the call as a function of the call interruption interval and the beginning of the lack of voice activity interval to switch to a second channel so as to monitor the SQI of at least one neighboring base station.

14. The computer program of claim 13, wherein the call interruption interval is a fixed interval T1 when the SQI is good, and a fixed interval T2 when the SQI is poor.

15. The computer program of claim 14, wherein interval T1 is longer than interval T2.

16. A computer program, residing on a computer-readable medium, for minimizing perceptible impact on an interrupted call during the monitoring of signal quality indications (SQI) of neighboring base stations prior to a hand-off operation, the computer program including instructions for causing a subscriber unit to:

establish a call between the subscriber unit and a first base station on a first channel;

periodically identify an SQI of the call on the first channel;

identify a probability of a lack of voice activity value during the call;

determine a call interruption interval as a function of the SQI of the call, where the call interruption interval is dynamically variable as a function of SQI; and interrupt the call as a function of the call interruption interval and the probability of the lack of voice activity value to switch to a second channel so as to monitor the SQI of at least one neighboring base station.

17. The subscriber unit of claim 16, wherein the call interruption interval is a fixed interval T1 when the SQI is good, and a fixed interval T2 when the SQI is poor.

18. The subscriber unit of claim 17, wherein interval T1 is longer than interval T2.

* * * * *